(12) United States Patent
Evenson, Jr.

(10) Patent No.: US 11,745,328 B1
(45) Date of Patent: Sep. 5, 2023

(54) SAWHORSE SUPPORT ATTACHMENT DEVICE

(71) Applicant: Ronald Evenson, Jr., Minnesota Lake, MN (US)

(72) Inventor: Ronald Evenson, Jr., Minnesota Lake, MN (US)

(*) Notice: Subject to any disclaimer, the term of this patent is extended or adjusted under 35 U.S.C. 154(b) by 0 days.

(21) Appl. No.: 17/678,109

(22) Filed: Feb. 23, 2022

(51) Int. Cl.
| | | |
|---|---|---|
| *B25H 1/06* | (2006.01) | |
| *B25H 1/10* | (2006.01) | |
| *B23Q 3/00* | (2006.01) | |
| *B25B 11/00* | (2006.01) | |
| *B25H 1/04* | (2006.01) | |

(52) U.S. Cl.
CPC ............... *B25H 1/06* (2013.01); *B23Q 3/00* (2013.01); *B25B 11/00* (2013.01); *B25H 1/04* (2013.01); *B25H 1/10* (2013.01)

(58) Field of Classification Search
CPC ... B25H 1/04; B25H 1/06; B25H 1/08; B25H 1/10; B25H 1/0078; A47B 3/08; B25B 11/00; B25B 11/02; B27B 5/06; B27B 17/0041; B23Q 3/00; B23Q 9/0042; B23Q 9/0014
USPC ............................ 269/309, 16, 136–138, 291
See application file for complete search history.

(56) References Cited

U.S. PATENT DOCUMENTS

| | | | | |
|---|---|---|---|---|
| 4,191,111 A | * | 3/1980 | Emmert | A47B 3/0916 248/440 |
| 4,330,113 A | * | 5/1982 | Ferdinand | B25B 1/02 269/208 |
| 4,386,767 A | * | 6/1983 | Dyckes | B25H 1/06 269/204 |
| 4,498,662 A | * | 2/1985 | Halter | B25H 1/10 269/283 |
| 4,790,411 A | | 12/1988 | Ottoson | |
| 4,951,782 A | * | 8/1990 | Hanson | B25H 1/06 182/225 |
| 5,526,856 A | * | 6/1996 | Ped | B23Q 1/74 144/287 |
| 5,535,847 A | * | 7/1996 | DuRapau | B25H 1/06 108/157.1 |
| 5,628,382 A | * | 5/1997 | Hill | B25H 1/06 182/153 |
| RE35,627 E | * | 10/1997 | Estrem | B23D 59/007 108/55.3 |
| 5,836,365 A | * | 11/1998 | Derecktor | B25H 1/06 144/286.5 |

(Continued)

FOREIGN PATENT DOCUMENTS

CA       2659628       9/2009

*Primary Examiner* — Brian D Keller
*Assistant Examiner* — Tim Brady

(57) ABSTRACT

A sawhorse support attachment device for attaching supports for construction use includes a stand unit. The stand unit comprises a pair of bases, a plurality of stands, and a pair of chains. Each of the bases has a hollow interior that defines a space for an insert to be nested within. A pair of stands is attached to each of the bases at an angle to create a sawhorse assembly when in an open position. A pair of chains connects each of the pair of stands to each other. The chains provide supplemental stability to the stand unit when attaching elements. A support has a bracket with a pair of inserts. The pair of inserts is nested into the hollow interior of the pair of bases when attaching to the stand unit. A platform having the bracket and pair of inserts can attach to the stand unit.

17 Claims, 10 Drawing Sheets

(56) References Cited

U.S. PATENT DOCUMENTS

| | | | | |
|---|---|---|---|---|
| 5,868,054 | A * | 2/1999 | Chubb | B27B 5/20 144/286.5 |
| 5,988,243 | A * | 11/1999 | Ayala | B23D 47/025 144/286.5 |
| 6,029,721 | A * | 2/2000 | O'Banion | B23D 47/025 144/286.5 |
| 6,155,318 | A | 12/2000 | Underwood | |
| 6,347,592 | B1 * | 2/2002 | Gessert | B25H 1/04 108/157.16 |
| 6,896,102 | B1 | 5/2005 | Nichol | |
| 7,481,254 | B2 * | 1/2009 | Welsh | B25H 1/06 144/286.5 |
| 7,766,125 | B2 * | 8/2010 | Fowler | B25H 1/06 182/163 |
| 8,016,079 | B1 | 9/2011 | Huls | |
| D681,851 | S | 5/2013 | Zidek | |
| 8,657,072 | B2 * | 2/2014 | Caple | B25H 1/06 182/183.1 |
| D872,877 | S | 1/2020 | Hanlon | |
| 10,611,016 | B1 * | 4/2020 | Riley | B25H 1/10 |
| 11,110,588 | B1 * | 9/2021 | van der Pol | B25H 1/08 |
| 11,130,512 | B1 * | 9/2021 | Mayo, IV | B62B 3/02 |
| 2002/0011381 | A1 * | 1/2002 | Wilkerson | B25H 1/06 182/225 |
| 2002/0166725 | A1 * | 11/2002 | Gulledge | B25H 1/06 182/225 |
| 2002/0179181 | A1 * | 12/2002 | Murphy | B25H 1/04 144/286.5 |
| 2004/0250901 | A1 * | 12/2004 | Ursell | B25H 1/10 144/286.1 |
| 2009/0114130 | A1 * | 5/2009 | Chirea | A47B 7/02 108/124 |
| 2011/0180505 | A1 * | 7/2011 | Noniewicz | B27B 21/00 211/195 |
| 2012/0132049 | A1 * | 5/2012 | Bokelaar | B23Q 9/0078 83/574 |
| 2019/0047136 | A1 * | 2/2019 | Maresca | B25H 1/06 |
| 2021/0046634 | A1 | 2/2021 | Shechtman | |
| 2021/0107133 | A1 * | 4/2021 | Hanlon | B25H 1/06 |
| 2021/0316439 | A1 * | 10/2021 | Nguyen | B25H 1/16 |
| 2022/0266362 | A1 * | 8/2022 | Radigan | B23D 47/02 |
| 2022/0324039 | A1 * | 10/2022 | Young | B27B 5/181 |
| 2022/0362923 | A1 * | 11/2022 | Baveloni | B25H 1/04 |

* cited by examiner

SAWHORSE SUPPORT ATTACHMENT DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to sawhorse apparatuses and more particularly pertains to a new sawhorse apparatus for attaching supports for construction use.

(2) Description of Related Art Including Information Disclosed Under 37 CFR 1.97 and 1.98

The prior art relates to sawhorse apparatuses. The prior art includes a variety of sawhorse apparatuses having foldable support arms and a flat base surface. Known prior art lacks a sawhorse apparatus having an attachable flat base surface with a pair of chains to provide support to the support arms.

BRIEF SUMMARY OF THE INVENTION

An embodiment of the disclosure meets the needs presented above by generally comprising a stand unit. The stand unit includes a pair of bases, a pair of stands, and a pair of chains. Each of the bases has a joint surface. Each of the bases is positioned adjacent to each other whereby the joint surface of each of the bases is abutting each other. Each of the bases has a hollow interior that defines a space for a variety of elements to be positioned within. A pair of stands is coupled to a respective one of each of the bases. The pair of stands of each of the bases is configured for enabling a sawhorse standing position. Each chain of the pair of chains is a set of chain links. Each of the chains is configured for providing stability to the pair of stands. A support has a peripheral surface and a hidden surface. A bracket is coupled to the hidden surface of the support and a pair of inserts is coupled to the bracket. The pair of inserts is configured for being nested within the hollow interior of the pair of bases whereby retaining the support from movement. A pair of brackets is coupled to the peripheral surface of the support. The pair of brackets is configured for restraining an item positioned between each of the brackets. A platform has a hidden surface with a bracket coupled to the hidden surface. The pair of inserts is coupled to the bracket of the platform. The platform is configured for holding a variety of construction related items.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
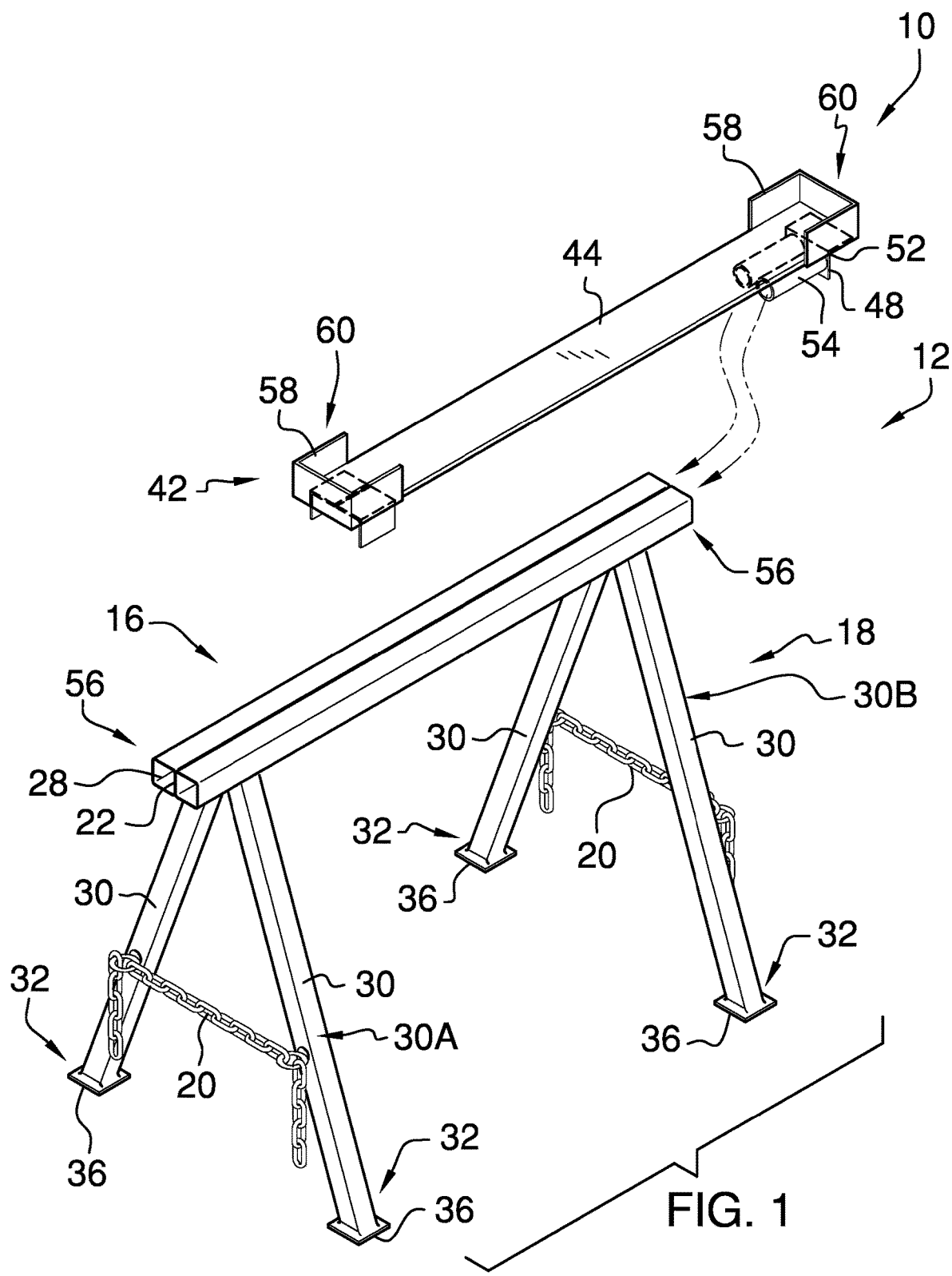
FIG. 1 is an isometric view of a sawhorse support attachment device according to an embodiment of the disclosure.

With reference now to the drawings, and in particular to FIGS. 1 through 11 thereof, a new sawhorse apparatus embodying the principles and concepts of an embodiment of the disclosure and generally designated by the reference numeral 10 will be described.

As best illustrated in FIGS. 1 through 11, the sawhorse support attachment device 10 generally comprises a stand unit 12. The stand unit 12 is made from a metal material 14. The stand unit 12 comprises a pair of bases 16, a plurality of stands 18, and a pair of chains 20. The stand unit 12 is configured to create a sawhorse assembly.

Each base 16 of the pair of bases 16 is a rectangular prism shape. Each of the bases 16 has a joint surface 22 and each of the bases 16 is positioned adjacent to each other whereby the joint surface 22 of each of the bases 16 is abutting each other. The positioning each of the bases 16 is configured for providing an area for an element to be positioned above. Each of the bases 16 has a bottom surface 24. Each hinge 26 of a plurality of hinges 26 is coupled to the bottom surface 24 of each of the bases 16. Each of the hinges 26 is configured for adjusting the positioning of each of the bases 16 relative to each other.

Each of the bases 16 has a hollow interior 28. The hollow interior 28 of each of the bases 16 defines a space for a variety of elements to be positioned within. A pair of stands 30 of the plurality of stands 18 is coupled to a respective one of each of the bases 16. Each of the stands 18 is a rectangular prism shape. Each of the stands 18 has a distal end 32 and a proximal end 34 relative to the pair of bases 16. The distal end 32 of each of the stands 18 is a free end. A footing 36 is coupled to the free end of each of the stands 18. The footing 36 has a rectangular shape and is positioned parallel to the pair of bases 16 when in an open position 11. The footing 36 of each of the stands 18 is configured to provide stability to the stand unit 12 when in the open position 11.

The proximal end 34 of each of the stands 18 is coupled to the bottom surface 24 of each of the bases 16. The pair of stands 30 of each of the bases 16 is positioned at an angle relative to the bases 16. The pair of stands 30 of a first base 16A of the pair of bases 16 mirrors the pair of stands 30 of a second base 16B of the pair of bases 16. The positioning of the pair of stands 30 of each of the bases 16 is configured to create an "A" shape and provide the maximum surface contact for the footing 36 of each of the stands 18.

Each chain 20 of a pair of chains 20 is a set of interconnected chain links. Each of the chains 20 is a durable material 38 that defines a material resistant to rupturing from tension force. Each of the chains 20 has a pair of ends 40. A first end 40A of each of the ends 40 of each of the chains 20 is coupled to a respective one of a first stand 30A of the pair of stands 30. A second end 40B of each of the ends 40 of each of the chains 20 is coupled to a respective one of a second stand 30B of the pair of stands 30.

Each of the chains 20 is configured for providing stability to the pair of stands 30 of each of the bases 16. When the stand unit 12 is in the open position 11, each of the chains 20 is extended by tension force from each of the stands 30 whereby providing reinforcement to the stand unit 12. When the stand unit 12 is in a folded position 13, each of the chains 20 is in a drooping position whereby no tension force is applied to the pair of chains 20.

Figure 2:
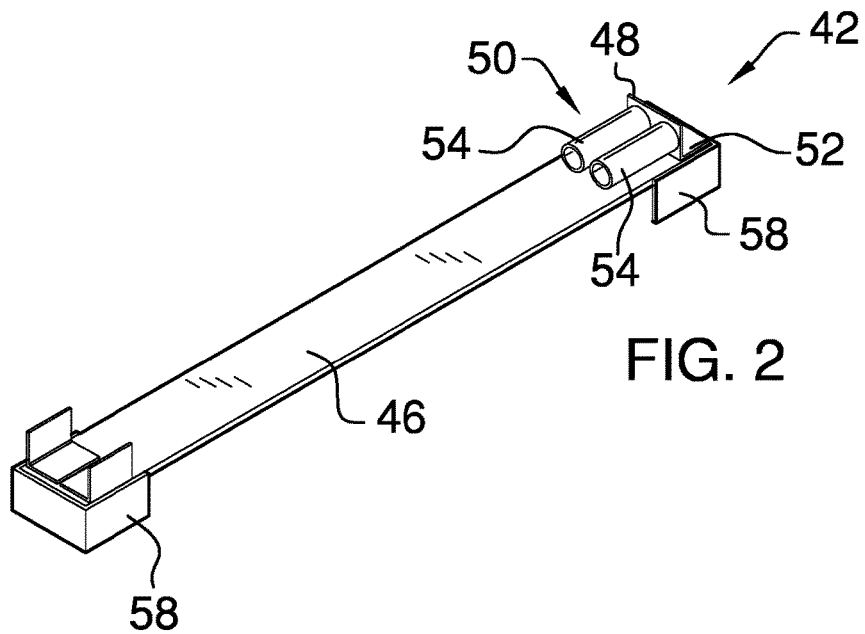
FIG. 2 is a bottom isometric view of an embodiment of the disclosure.
Figure 3:
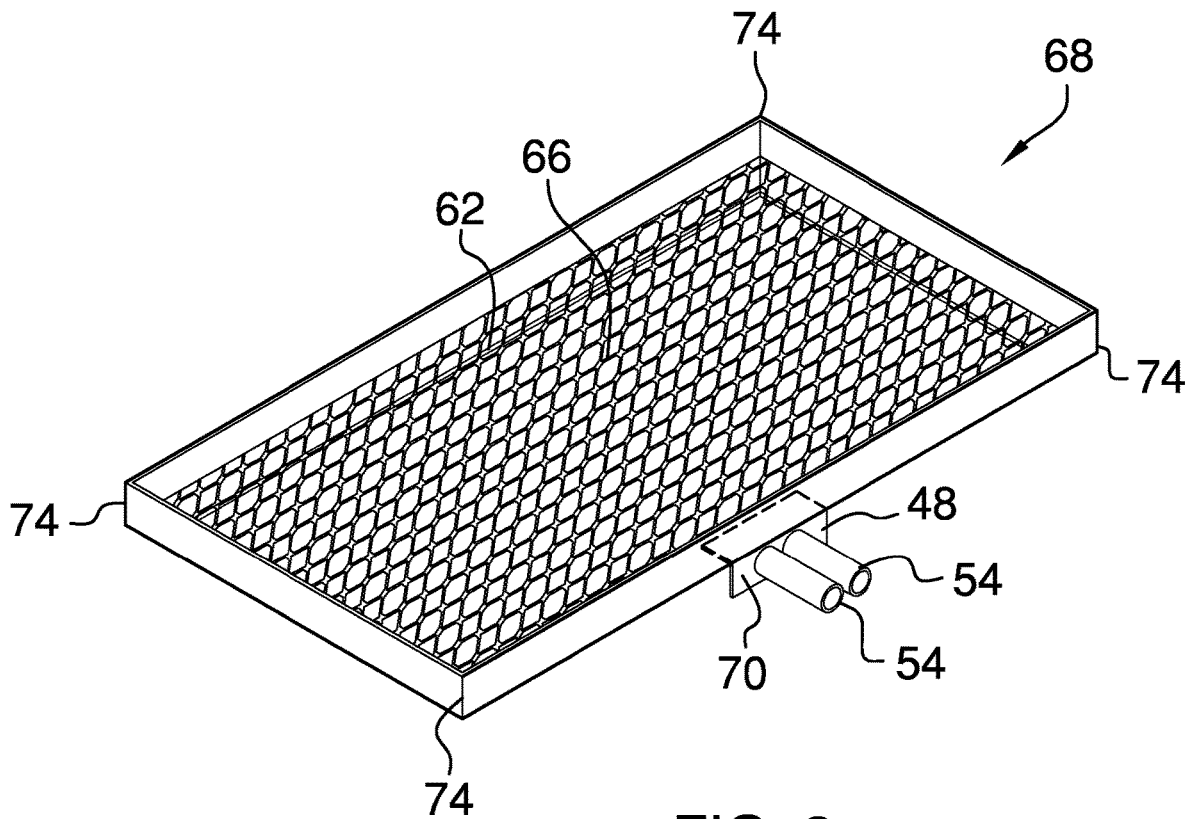
FIG. 3 is an isometric view of an embodiment of the disclosure.
Figure 4:
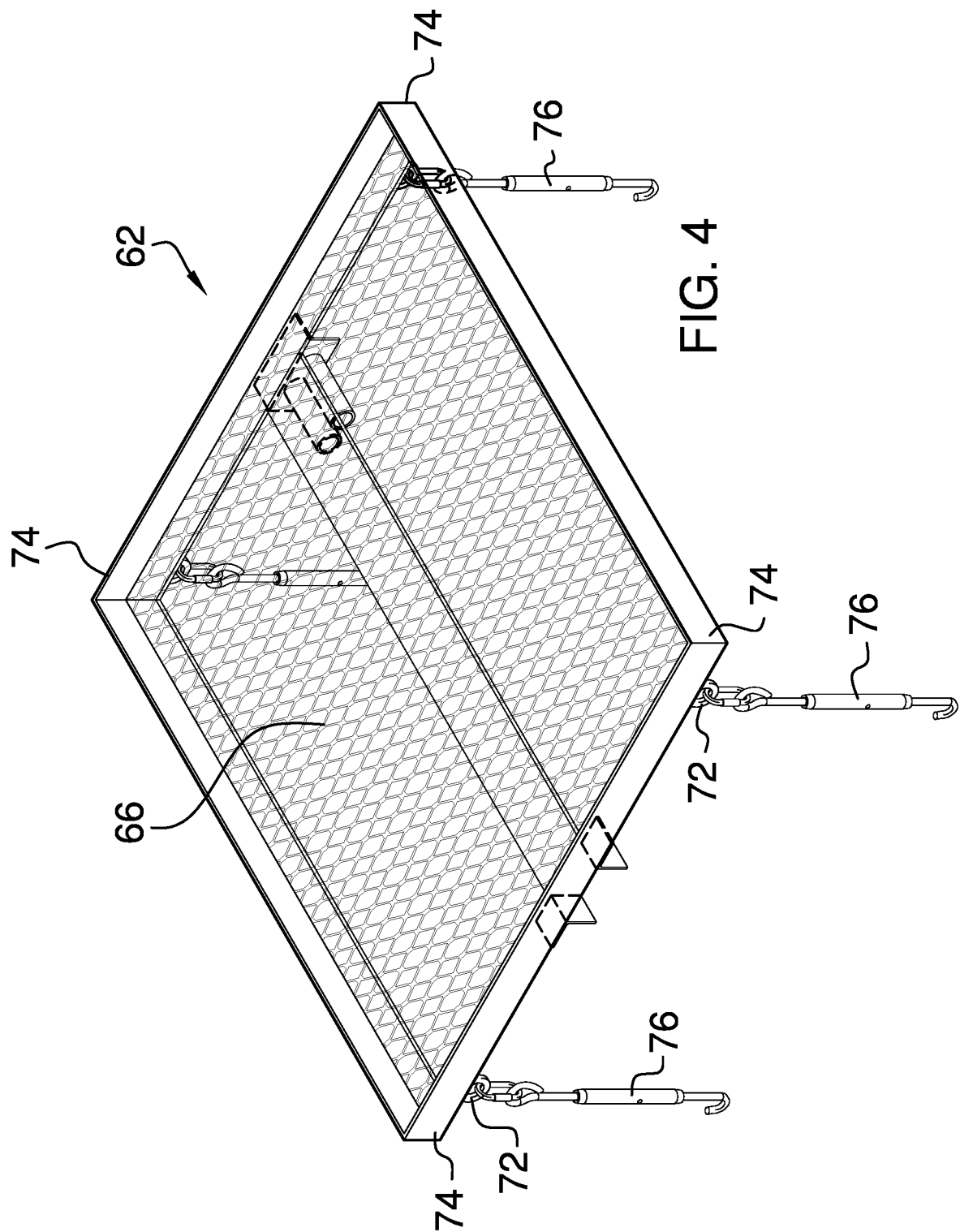
FIG. 4 is an isometric view of an embodiment of the disclosure.
Figure 5:
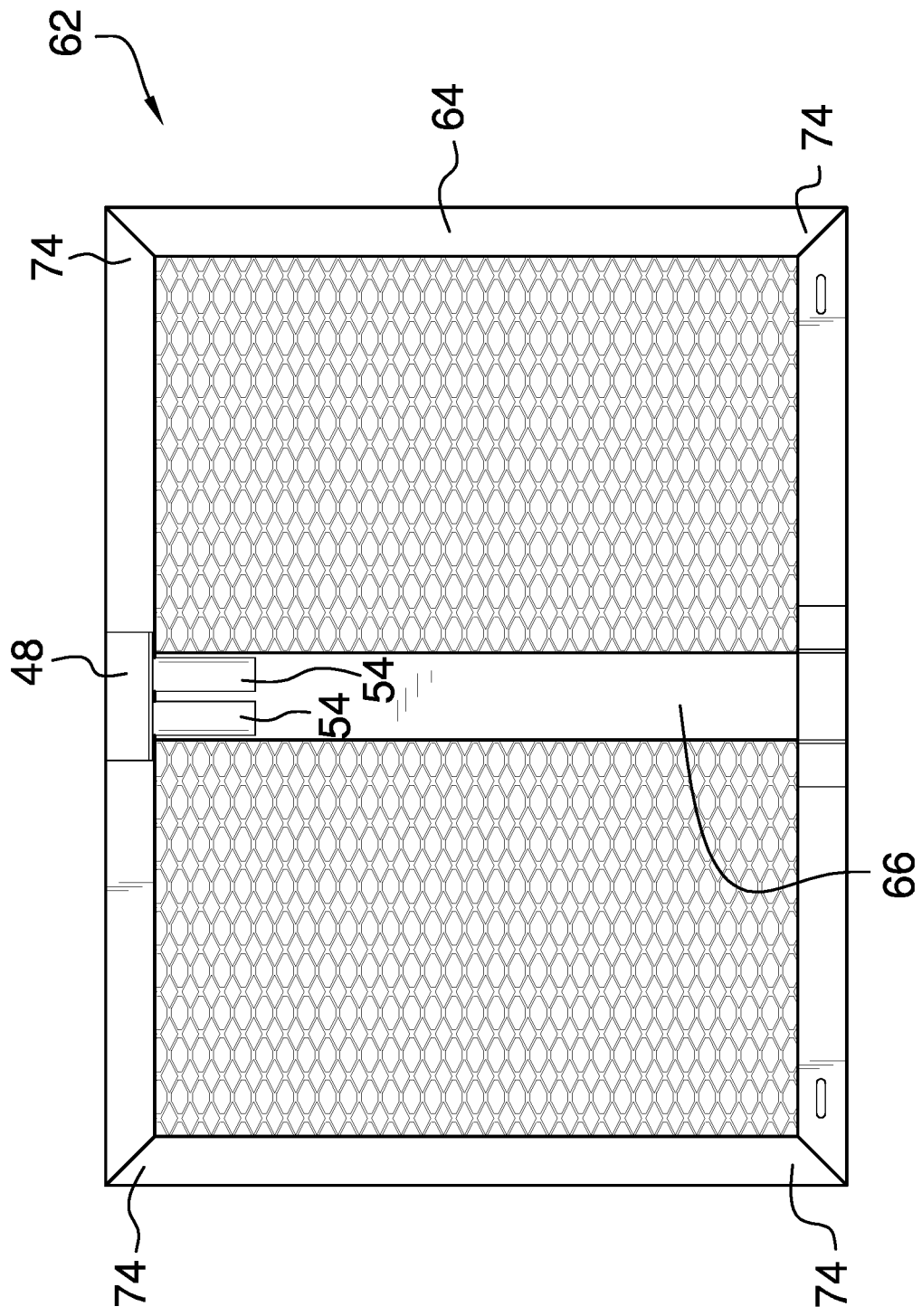
FIG. 5 is a bottom view of an embodiment of the disclosure.
Figure 6:
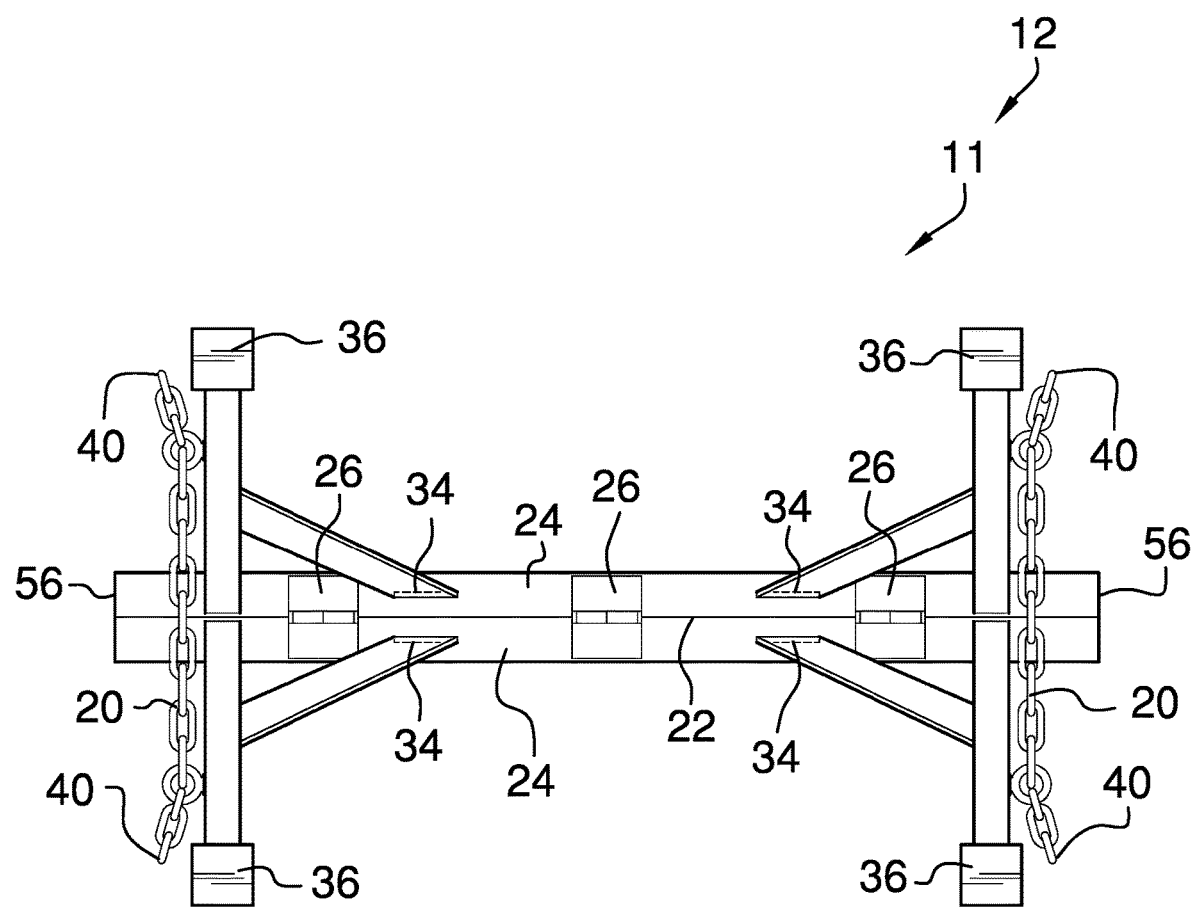
FIG. 6 is a bottom view of an embodiment of the disclosure.
Figure 7:
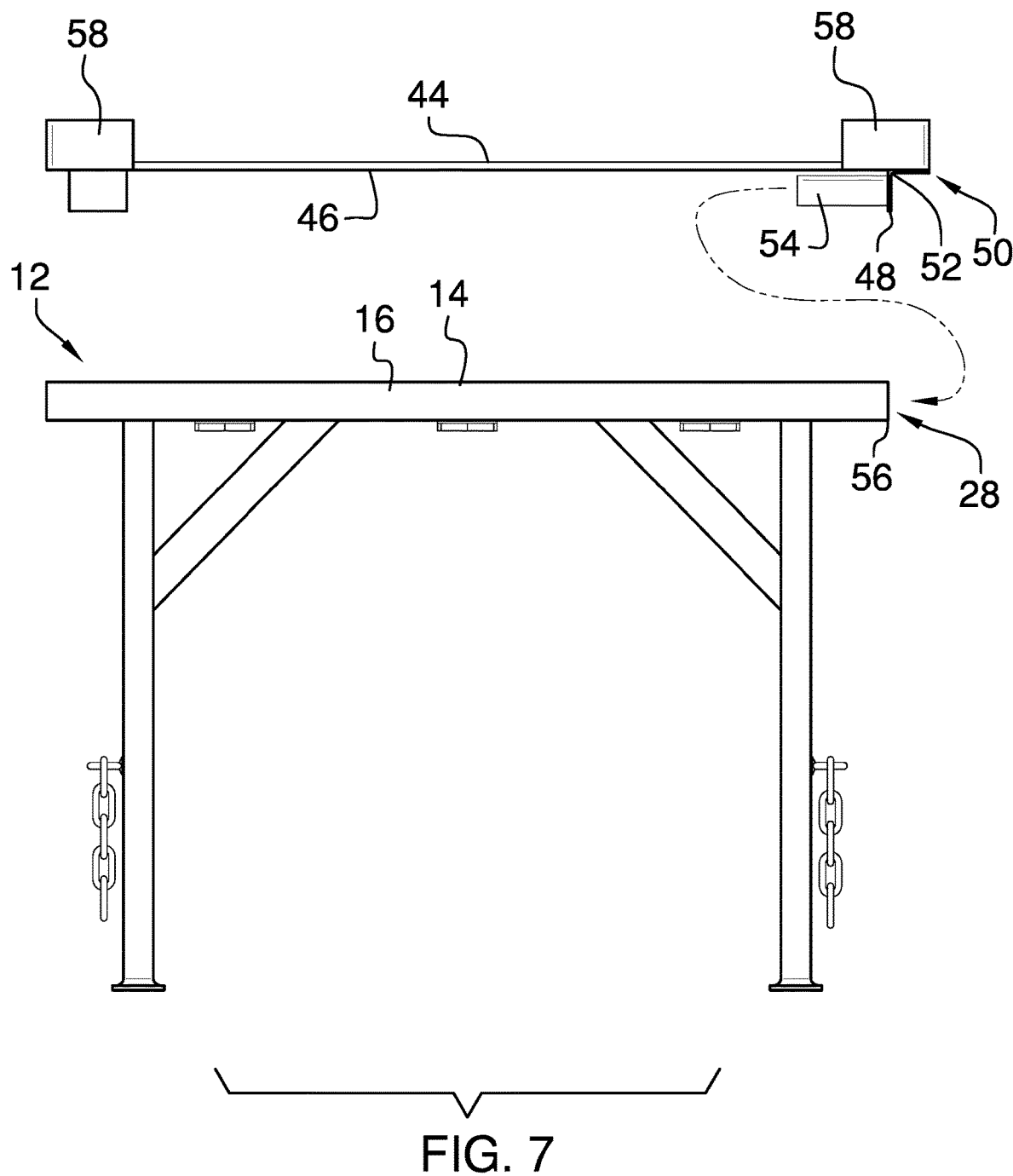
FIG. 7 is a front view of an embodiment of the disclosure.
Figure 8:
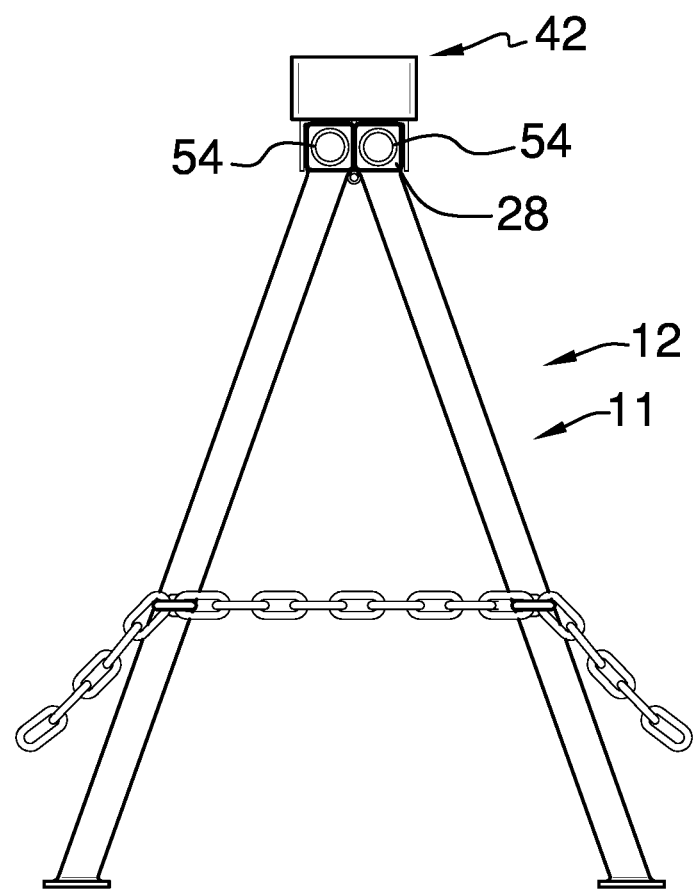
FIG. 8 is a side view of an embodiment of the disclosure.
Figure 9:
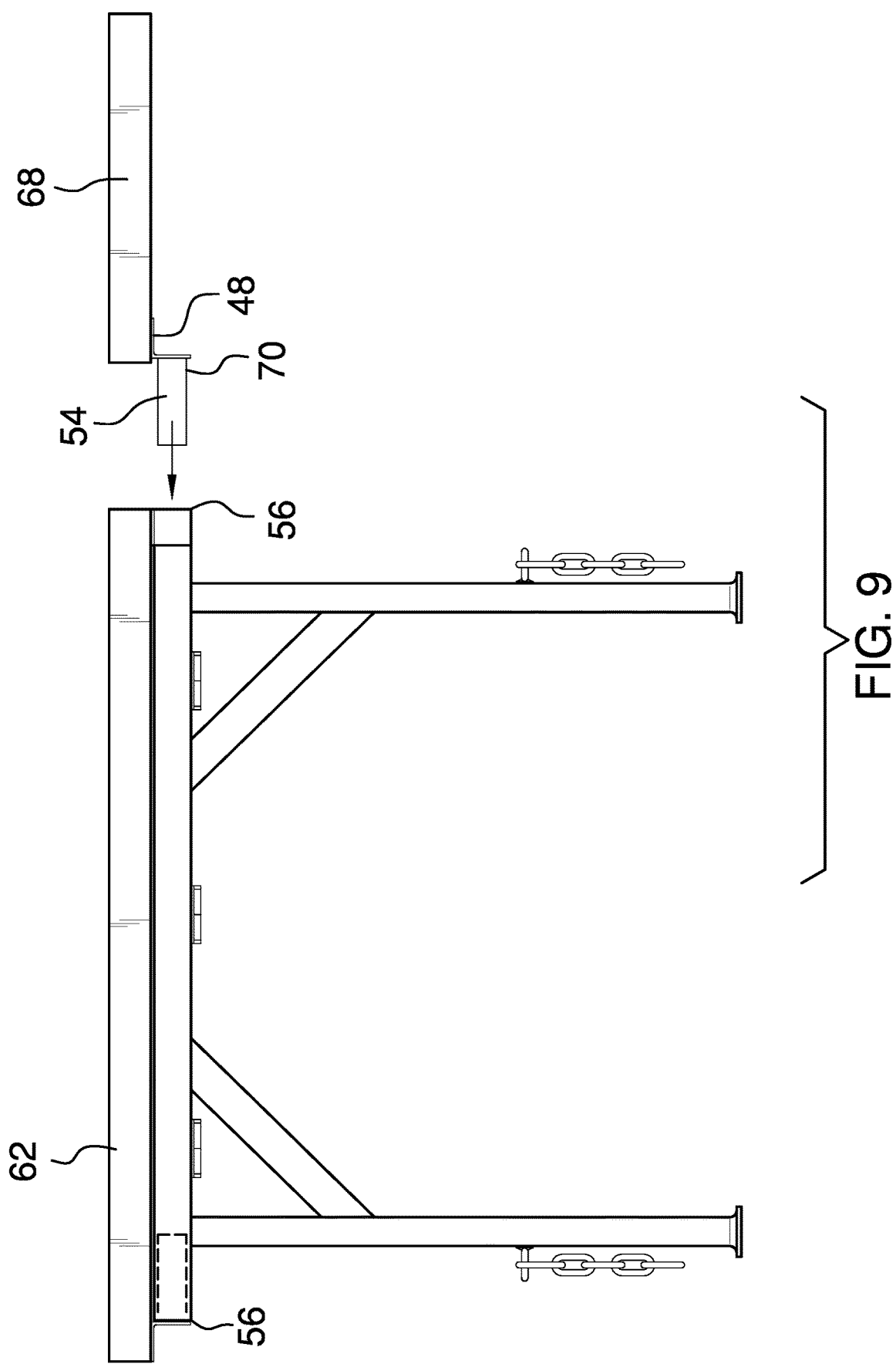
FIG. 9 is a back view of an embodiment of the disclosure.
Figure 10:
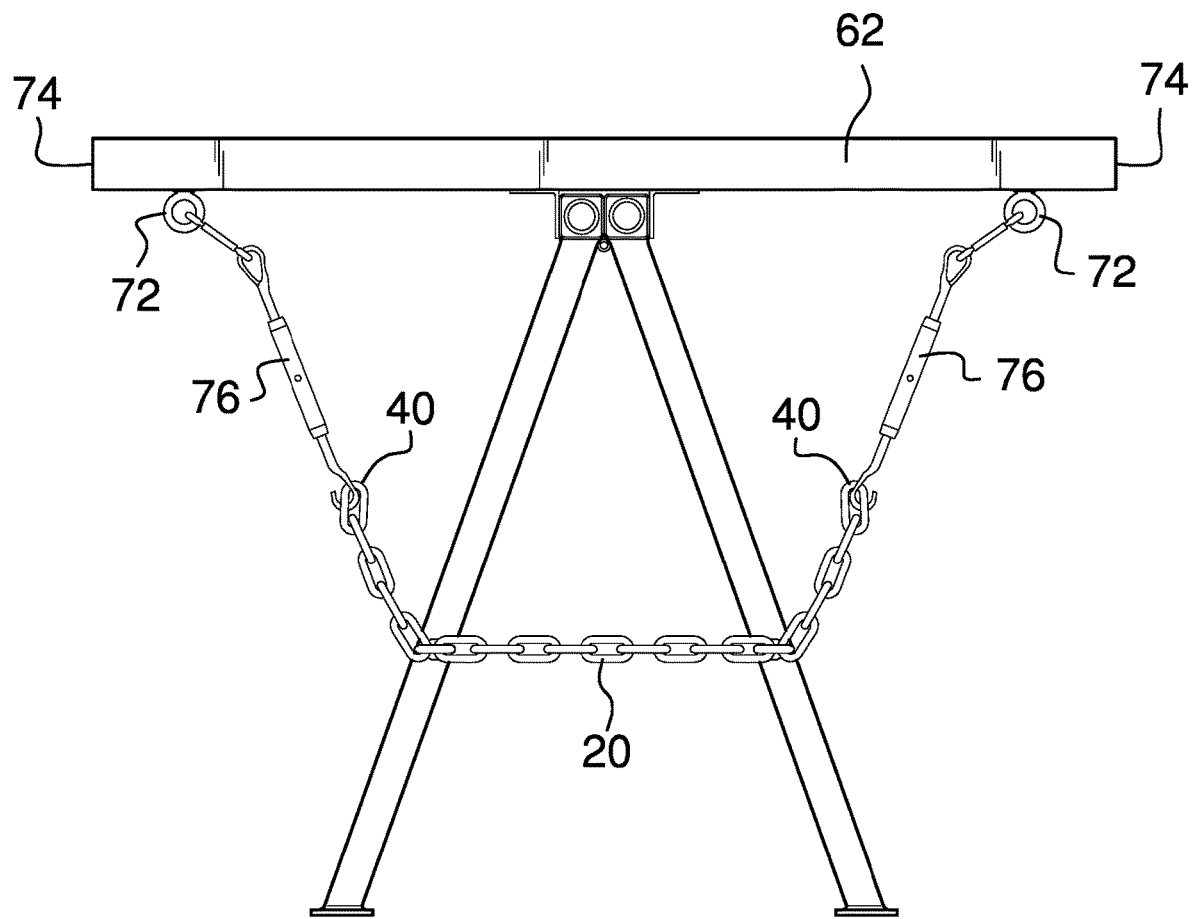
FIG. 10 is an in-use view of an embodiment of the disclosure.
Figure 11:
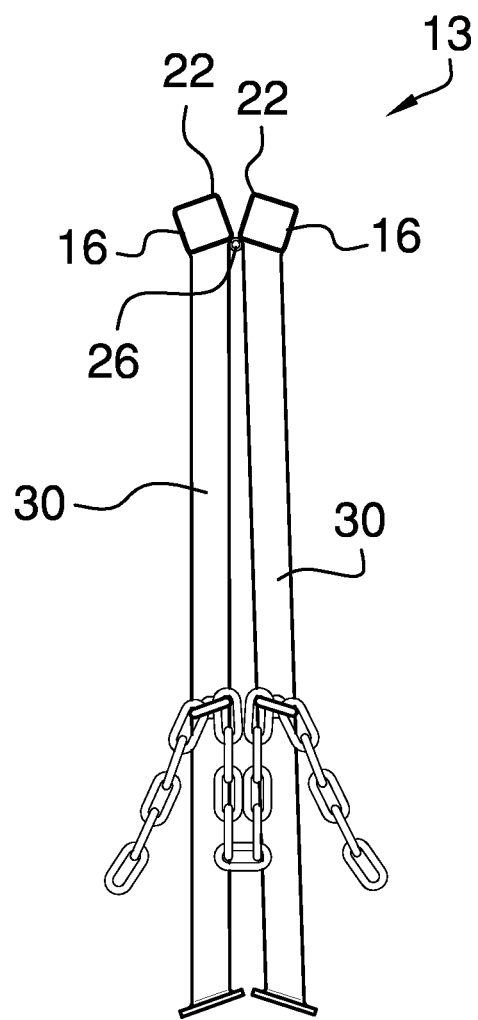
FIG. 11 is a folded view of an embodiment of the disclosure.

A support 42 has a rectangular shape. The support 42 has a peripheral surface 44 as shown in FIG. 1, and a hidden surface 46 as shown in FIG. 2. A bracket 48 is coupled to the hidden surface 46 and is positioned proximate to an end 50 of the hidden surface 46 of the support 42. The bracket 48 has a ninety degree bend 52 and is configured for positioning a half of the bracket to be perpendicular relative to the support 42. A pair of inserts 54 is coupled to the bracket 42. Each of the inserts 54 is parallel to each other and the pair of inserts 54 is parallel to the support 42. Each of the inserts 54 is cylindrical shaped. The pair of inserts 54 is configured for being nested within the hollow interior 28 of the pair of bases 16 when in the open position 11 whereby retaining the support 42 in a fixed position relative to the pair of bases 16. The pair of inserts 54 can be inserted in each end 56 of a pair of ends 56 of each of the bases 16.

A pair of brackets 58 is coupled to the peripheral surface 44 of the support 42. Each of the brackets 58 is positioned proximate to a respective one of each end 60 of a pair of ends 60 of the peripheral surface 44. The pair of brackets 58 is configured for restraining an item that is positioned between each of the brackets 58, such as a slab of wood 15. Similar to the support 42, a platform 62 has a rectangular shape with a hidden surface 64. The platform 62 has the bracket 48 with a ninety degree bend 52 coupled to the hidden surface 64. The pair of inserts 54 is coupled to the bracket 48 and is protruding out towards a center 66 of the platform 62. The pair of inserts 54 of the platform 62 is configured for being nested within the hollow interior 28 of the pair of bases 16, similar to the support 42.

The platform 62 is made of the durable material 38 whereby the platform 62 is resistant to fatigue from extreme force applied to it. The platform 62 is configured for holding a variety of construction related items 17. The center 66 of the platform 62 is configured to be positioned atop the pair of bases 16 whereby the pair of bases 16 provides additional support to the platform 62.

A second version 68 of the platform 62 has the bracket 48 coupled to the hidden surface 64 of the platform 62. The pair of inserts 54 is coupled to an opposite surface 70 of the bracket 48 whereby the pair of inserts 54 is protruding away from the center 66 of the platform 62 rather than towards the center 66 of the platform 62.

Each ring 72 of a plurality of rings 72 is coupled proximate to a respective one of each corner 74 of a plurality of corners 74 of the platform 62. Each turnbuckle 76 of a plurality of turnbuckles 76 is attached to each ring 72 of the plurality of rings 72. Each of the turnbuckles 76 is configured for fastening to a respective one of each end 40 of the pair of ends 40 of each of the chains 20. The function of each of the turnbuckles 76 is for tuning the amount of tension within each of the chains 20 whereby assisting in retaining the platform 62 in a fixed position relative to the stand unit 12.

In use, the user positions the stand unit 12 from the folded position 13 into the open position 11 by pulling the pair of stands 30 of each of the bases 16 out from each other. The joint surface 22 of each of the bases 16 will abut each other when in the open position 11. Each of the chains 20 will be extended by the tension force between the pair of stands 30 of each of the bases 16. When the stand unit 12 is in the open position 11, the pair of inserts 54 of either the support 42 or the platform 62 can be nested into the hollow interior 28 of the pair of bases 16 whereby retaining either the support 42 or the platform 62 in a fixed position relative to the stand unit 12. When the support 42 is attached to the stand unit 12, an item such as a slab of wood 15 can be positioned between the pair of brackets 58 of the support 42 whereby the user can use the item for construction related work.

When the platform 62 is attached to the stand unit 12, each of the turnbuckles 76 of the platform 62 can be fastened to each end 40 of the pair of ends 40 of each of the chains 20. The user can tune each of the turnbuckles 76 to increase the tension between each of the rings 72 of the platform 62 to each of the chains 20 whereby increasing stability of the platform 62 atop of the stand unit 12.

When the platform 62 is secured to the stand unit 12, a variety of construction related items 17 can be placed atop the platform 62. The platform 62 and the stand unit 12 are configured to holding a major amount of weight without collapsing. When use of the sawhorse support attachment device 10 is complete, the user must first remove either the support 42 or the platform 62 from the stand unit 12 and then push the pair of stands 30 of each of the bases 16 towards each other into the folded position 13.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A sawhorse support attachment device comprising:
   a stand unit, said stand unit comprising
      a pair of bases, each of said bases having a joint surface, each of said bases being positioned adjacent to each other whereby said joint surface of each of said bases abutting each other, each of said bases having a hollow interior, said hollow interior of each of said bases defining a space for a variety of elements to be positioned within,
      a plurality of stands, a pair of stands of said plurality of stands being coupled to a respective one of each of said bases, said pair of stands of each of said bases being configured for enabling a sawhorse standing position for said sawhorse support attachment device, and
      a pair of chains, each of said chains being a set of chain links, each of said chains being configured for providing stability to said pair of stands; and
   a support, said support having a peripheral surface and a hidden surface, a support bracket being coupled to said hidden surface of said support, a pair of support inserts being coupled to said platform bracket, said pair of support inserts being configured for being selectively nested within said hollow interior of said pair of bases whereby retaining said support from movement, a pair of lateral support brackets being coupled to said peripheral surface of said support, said pair of lateral support brackets being configured for restraining an item positioned between each of said lateral support brackets; and
   a platform, said platform having a hidden surface, a platform bracket being coupled to said hidden surface of said platform, said pair of platform inserts being coupled to said platform bracket of said platform for alternatively coupling said platform to said stand unit, said platform being configured for holding a variety of construction related items.

2. The sawhorse support attachment device of claim 1, further comprising said stand unit being a metal material.

3. The sawhorse support attachment device of claim 1, further comprising each of said bases being a rectangular prism shape.

4. The sawhorse support attachment device of claim 1, further comprising a plurality of hinges is coupled to each of said bases, each of said hinges being configured for altering the positioning of each of the bases relative to each other.

5. The sawhorse support attachment device of claim 1, further comprising each of said stands being a rectangular prism shape.

6. The sawhorse support attachment device of claim 1, further comprising each of said stands having a distal end and a proximal end relative to each of said bases, said distal end of each of said stands being a free end.

7. The sawhorse support attachment device of claim 6, further comprising a footing being coupled to said free end of each of said stands, said footing being a rectangular shape, said footing being parallel relative to each of said bases.

8. The sawhorse support attachment device of claim 6, further comprising said proximal end of each of said stands being coupled to a bottom surface of each of said bases.

9. The sawhorse support attachment device of claim 1, further comprising said pair of stands coupled to each of said bases at an angle.

10. The sawhorse support attachment device of claim 1, further comprising each of said chains being a durable material, said durable material defining a material resistant to rupturing from tension.

11. The sawhorse support attachment device of claim 1, further comprising each of said chains having a pair of ends, a first one of said pair of ends being coupled to a first stand of said pair of stands, a second end of each of said ends of each of said chains one of said pair of ends being coupled to a second stand of said pair of stands.

12. The sawhorse support attachment device of claim 1, further comprising said support being a rectangular shape.

13. The sawhorse support attachment device of claim 1, further comprising said support bracket being positioned proximate to an end of said support, said support bracket having a ninety degree bend, said ninety degree bend being configured for positioning a half of said support bracket to be perpendicular relative to said support.

14. The sawhorse support attachment device of claim 1, further comprising each of said support inserts being cylindrical shaped.

15. The sawhorse support attachment device of claim 1, further comprising a pair of lateral support brackets being coupled to said peripheral surface of said support, each of said lateral support brackets being positioned proximate to a respective one of each end of a pair of ends of said peripheral surface, said pair of lateral support brackets configured for restraining an item positioned between each of said lateral support brackets.

16. The sawhorse support attachment device of claim 1, further comprising said platform being a rectangular shape.

17. The sawhorse support attachment device of claim 1, further comprising a plurality of turnbuckles being attached to a plurality of rings coupled to said hidden surface of said platform, each of said turnbuckles being configured for fastening to a respective one of each of said ends of each of said chains, each of said turnbuckles being configured for tuning the amount of tension within each of said chains.

* * * * *